June 3, 1930.   E. J. VON HENKE   1,761,420
APPARATUS FOR WELDING WITH HIGH FREQUENCY CURRENTS
Filed April 16, 1926
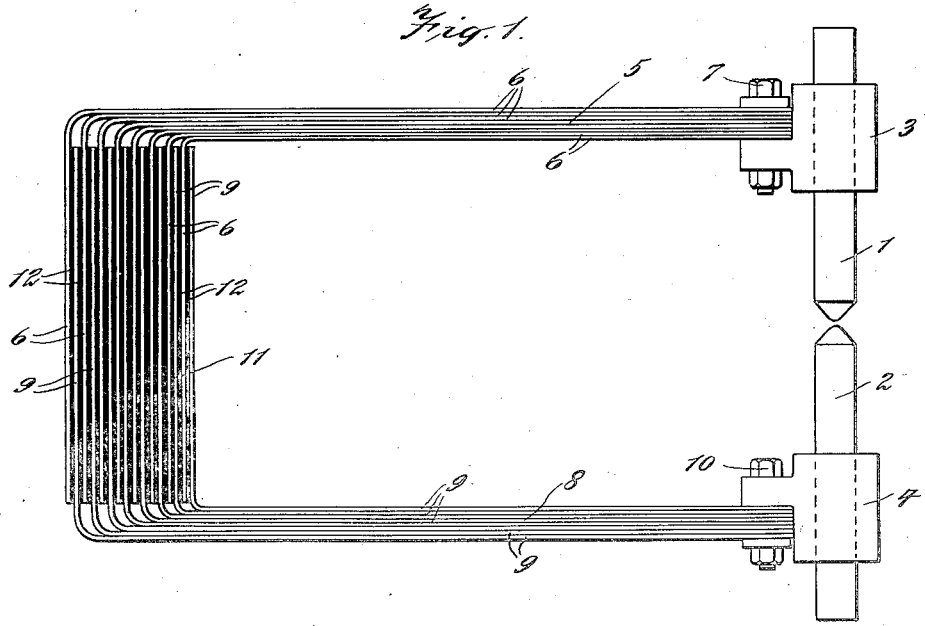
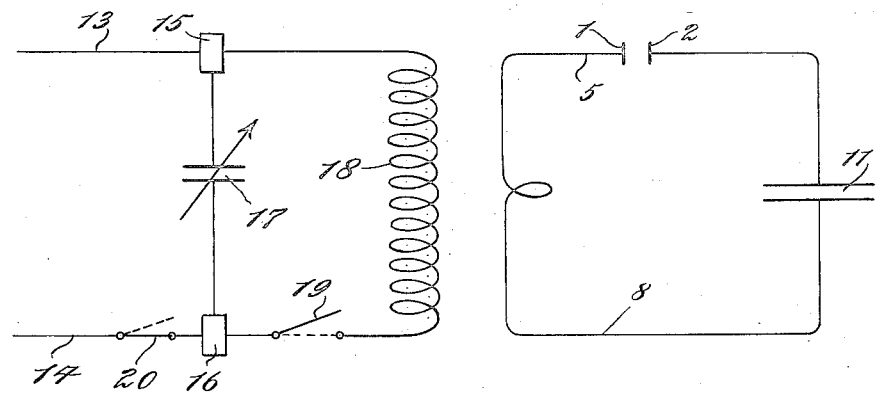
INVENTOR.
Edmund J. Von Henke
BY
Gifford & Scull
His ATTORNEYS.

Patented June 3, 1930

1,761,420

UNITED STATES PATENT OFFICE

EDMUND J. VON HENKE, OF CHICAGO, ILLINOIS, ASSIGNOR TO AMERICAN ELECTRIC FUSION CORPORATION, OF CHICAGO, ILLINOIS, A CORPORATION OF ILLINOIS

APPARATUS FOR WELDING WITH HIGH-FREQUENCY CURRENTS

Application filed April 16, 1926. Serial No. 102,419.

My invention relates to apparatus for welding, and particularly for such apparatus for welding rare earth metals with high frequency currents.

Most of the rare earth metals, as aluminum and its alloys such as duraluminum, chromium, molybdenum, bismuth, cannot be welded by electricity in the ordinary manner for the reason that the passage of a sufficient amount of welding current for an appreciable time interval heats the whole body of the metal to such a temperature as to virtually destroy the same. In some of these metals, such as aluminum, the oxide which forms on the surface is of much higher resistance than the inner parts of the metal and there is, therefore, considerable difficulty in causing the passage of welding current through this oxide film when low voltages, such as are used in ordinary resistance welding systems, are employed.

In my process I take advantage of the existence of this oxide film to produce a weld by surface fusion without materially heating the interior parts of the metal pieces to be joined.

It is well known in the electrical arts that the rate of heating is equal to $I^2R$, that is to say, the square of the current times the resistance. In welding aluminum there is a double thickness of oxide where the two pieces are placed together, thus affording a substantial area of high resistance and in my method I cause a fusion of these two surfaces by passing the discharge from a relatively large condenser through the parts to be welded. By proper adjustment, when designing, a secondary circuit may be produced having a period of frequency of such character that the condenser discharge is of very high frequency, for instance, 10,000 cycles per second, or higher. I have discovered that a satisfactory weld of the rare earth metals may be produced by sending a series of such condenser charges through the parts to be welded and that so far as I am able to determine the short period of time consumed in one of such discharges is not sufficient to substantially heat the interior portion of the parts, but does create an intense heat of the contact areas thus producing an effective surface fusion therebetween. By using high frequency currents for a very short period of time, such as that of a condenser discharge, the metal is not substantially changed in its structure while at the same time a satisfactory weld is produced.

Difficulty would be experienced in using welding transformers as heretofore constructed, because the selfinductance of such transformers is so high as to make it impossible to pass a secondary current at high frequency of such value as to produce a satisfactory weld.

I have overcome the above difficulty by constructing the secondary of the transformer so that it has an inherent capacity of such value as to render the secondary resonant with the primary at the selected frequency, thus negativing the self-induction of the secondary loop and enormously increasing the secondary current as compared with a similar transformer not having such capacity in the secondary.

My invention will be better understood by reading the following description taken in connection with the accompanying drawings forming a part thereof, and in which—

Fig. 1 is a side elevation of a transformer secondary embodying my invention; and Fig. 2 is a circuit diagram of connections embodying my invention.

Referring to the drawings, the two electrodes 1 and 2 may be of any suitable size, form and material. These electrodes are held in clamps 3 and 4, respectively, and one set 5 composed of a plurality of thin, flat conductors 6 is connected with the clamp 3 by bolt 7, and another set 8 of thin, flat conductors 9 is connected with the clamp 4 by bolt 10.

The free ends of the conductors 6 and 9 are overlapped at 11 and insulation 12 is placed between these overlapped conductors to form a condenser. The capacity of the condenser may be varied by adding additional conductors or varying the extent of overlap. The capacity of the secondary is so proportioned relative to the primary with which it is to be used that it is resonant therewith at the frequency with which it is to be used.

In Fig. 2, I have shown a diagram of circuit connections in which the source is designated by the conductors 13 and 14. In the instance illustrated direct current is supplied to these conductors which are in turn connected to terminals 15 and 16, respectively, of a variable condenser 17 of any well-known design. A primary coil 18 is connected with the condenser and a switch 19 is provided in the primary circuit. The supply line 14 is also provided with a switch 20. The numbers on the secondary of Fig. 2 are the same as those of corresponding parts on Fig. 1, the capacity being indicated in the accepted form at 11.

The movable electrode of the secondary and the switch 19 in the primary may be interconnected or otherwise arranged, but I prefer that the electrode come into contact with the work before the switch 19 is closed. Any suitable form of switching device may be used to produce this sequence of operation.

The switch 20 is also preferably operatively related to the switch 19 so that when 20 is closed 19 is open and vice versa. This permits the condenser 17 to be charged while the primary is open and then when the switch 19 is closed the condenser 17 discharges through the secondary loop upon the closing of the electrodes 1 and 2.

When the parts are properly adjusted the current which passes between the electrodes 1 and 2 is sufficient to weld material of ordinary thicknesses, the welding current value being calculable to any desired value by formulæ well understood by those skilled in the art.

While I have indicated a construction in which the capacity is self-contained, I desire to be understood that a separate and independent condenser of any known construction may be connected in series with the secondary of the transformer to produce the same effect as that shown, and while many changes may be made in the details of construction, I prefer to use the form of secondary shown in Fig. 1. Any desired means may be used for supporting the electrodes and moving the same relative to each other, these electrodes being shown more or less diagrammatically in my drawings.

I claim:

1. An electric welding circuit consisting of a primary adapted for 10,000 cycles per second, or higher, a secondary in inductive relation to said primary, said secondary consisting of a plurality of flat, thin conductors connected to the welding electrodes, insulation between the free ends of said conductors thus forming a condenser which renders the secondary resonant with the primary.

2. Welding apparatus consisting of a primary coil, welding electrodes, a secondary in inductive relation with the primary and having a set of thin, flat conductor strips connected with each electrode, said strips being overlapped at their other ends, insulation between the overlapped portions of said strips whereby a condenser is formed in the secondary of such value as to render the secondary resonant with the primary.

3. A secondary for welding transformers consisting of a plurality of sets of thin, flat conductors having their ends overlapped and spaced apart to form a condenser.

4. A secondary for welding transformers consisting of two electrodes, a plurality of sets of thin, flat conductors each having one end connected to one of said electrodes and the free ends overlapped and spaced apart to form a condenser.

5. A secondary for high frequency welding transformers consisting of a condenser and welding electrodes connected to the sides of the condenser and in series therewith.

6. An electric welding circuit consisting of a high frequency primary, a secondary circuit in inductive relation to said primary and having a fixed period of frequency, said primary having a capacity adjustable to that amount which renders its electrical period of vibration equal to that of the secondary.

EDMUND J. von HENKE.